May 25, 1943.  A. C. LINDGREN ET AL  2,320,148
TRACTOR POWER LIFTING ARRANGEMENT FOR CULTIVATORS
Filed July 12, 1940  4 Sheets-Sheet 1

Inventors
A.C. Lindgren
C.W. Mott
By Paul O. Pippel
Atty.

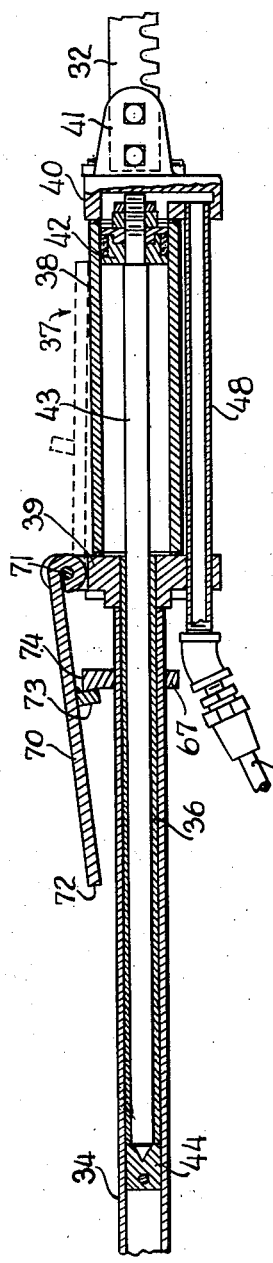
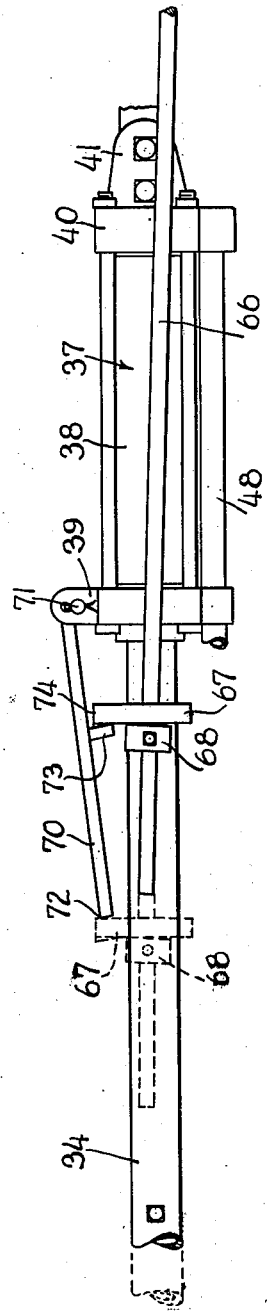

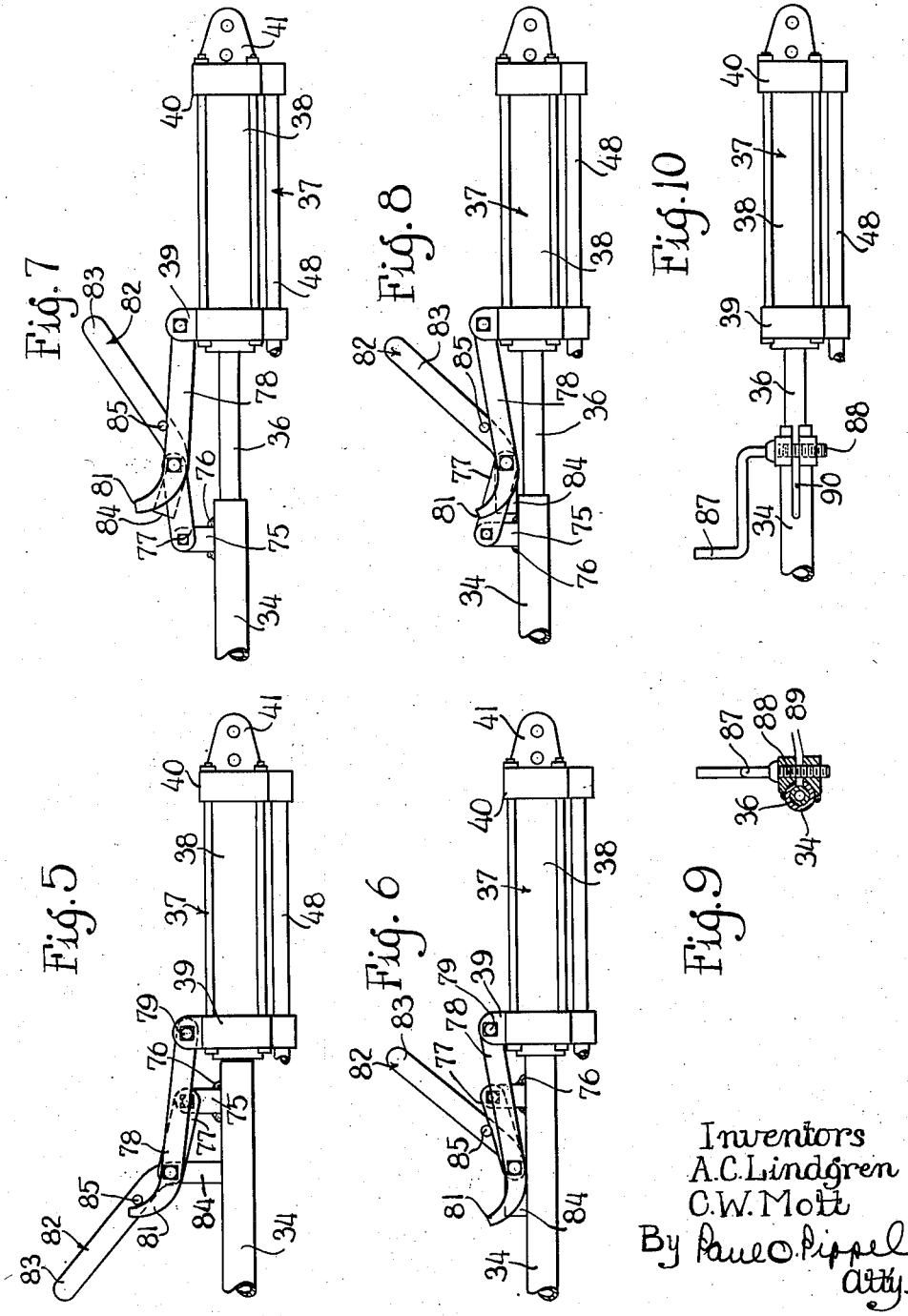

Patented May 25, 1943

2,320,148

UNITED STATES PATENT OFFICE 2,320,148

TRACTOR POWER LIFTING ARRANGEMENT FOR CULTIVATORS

Alexus C. Lindgren, Chicago, and Carl W. Mott, La Grange, Ill., assignors to International Harvester Company, a corporation of New Jersey Application July 12, 1940, Serial No. 345,144

6 Claims. (Cl. 97—50)

This invention relates to tractor lifting arrangements for direct-connected implements, and more particularly to an arrangement whereby implements at one location on the tractor may be retained in one of their positions independently of implements at another location on the tractor.

In the adaptation of a tractor cultivator arrangement for cultivation of crop rows which come to their termination at an acute angle with the end of the field, it becomes necessary that the implements at one side of the tractor have an independent control means whereby the same may be retained in its ground-working position for a time after the implements at the opposite side of the tractor have been lifted or reached the end of the field. These crop rows which arrive at the end of the field at an angle with the same, have been termed "point rows." This is because they terminate or come to the end of the field at a point rather than perpendicularly with the end of the field. This method of planting rows has become more common particularly since contouring of the land has been favored and where the plant rows are planted to follow the contours. In the Lindgren Patent 2,156,570, dated May 2, 1939, means was provided whereby the cultivating rig at one side could be retained while operating the cultivator rig at the other side. This means only served to retain the rig in its raised position and out of operation. The hinged element located on the hydraulic cylinder device at one side of the tractor could be thrown into engagement with the lifting pipe to retain the rig in its transport position. By so retaining the rigs at one side of the tractor, the rigs at the other side of the tractor could be operated independently of the rigs on the one side of the tractor. Such arrangement was not completely adaptable for use with point rows whereby the rigs at one side of the tractor could be held as well in their working position while the rigs at the opposite side of the tractor could be raised.

It is, therefore, an object of this invention to provide means whereby rigs at one side of the tractor can be retained in their working position as well as in their transport position removed from their working position so that the cultivator arrangement for the tractor is readily adapted to point row cultivation.

It is another object of the invention to provide a means for effecting such operation of the tractor cultivator which is easily accessible to the operator's station on the tractor and which may be easily manipulated for effecting the desired result of rendering the cultivator arrangement adaptable for point row cultivation.

It is another object of the invention to provide such a means wherein the locking may be effected within connections between the tractor and the implement which are already a part of the cultivator arrangement, all of which making for simplicity of structure of the cultivating arrangements.

According to the present invention there has been provided a positive locking device adapted to be carried by one of the telescoping parts of a power lift connection, a device which is adjustable at the will of the operator to positively lock a second part of the power lift connection by engagement with an abutting portion thereof. The connections between the power actuating means and the implement usually include telescoping parts and the locking means is so located or associated with these telescoping parts that the locking of the implement may be effected by the locking of the telescoping parts with respect to each other.

For a better understanding of the invention, reference may be had to the following detailed description taken in connection with the accompanying drawings, in which;

Figures 3 and 4 show a portion of the parts of the cultivating arrangement in enlarged detail and illustrating the working of the locking device;

Figures 5, 6, 7, and 8 show in detail a modified form of the invention wherein the use of a toggle mechanism is made for effecting locking of the telescoping parts; and, Figures 9 and 10 show in detail another modified form of the invention wherein the locking is effected by means of a clamp or friction device.

Figure 1:
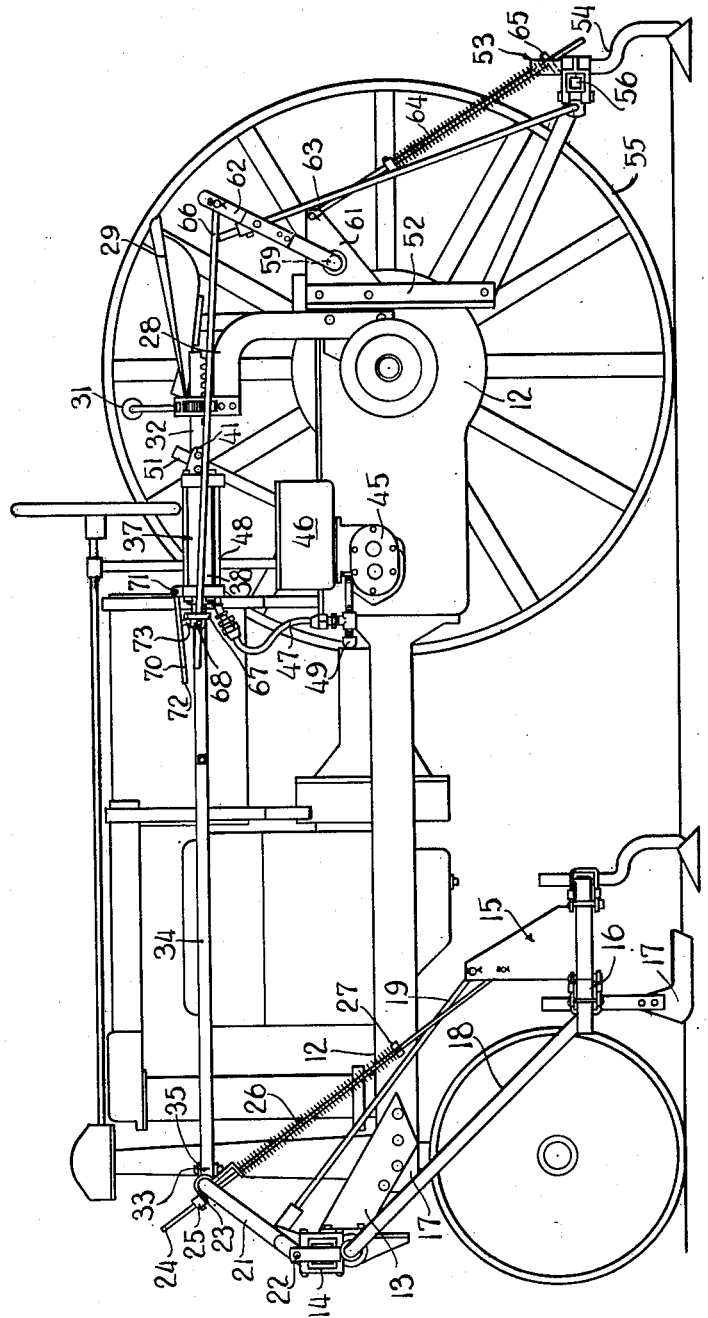
Figure 1 is a side view in elevation of a tractor with an implement structure attached and incorporating one form of the present invention.
Figure 2:
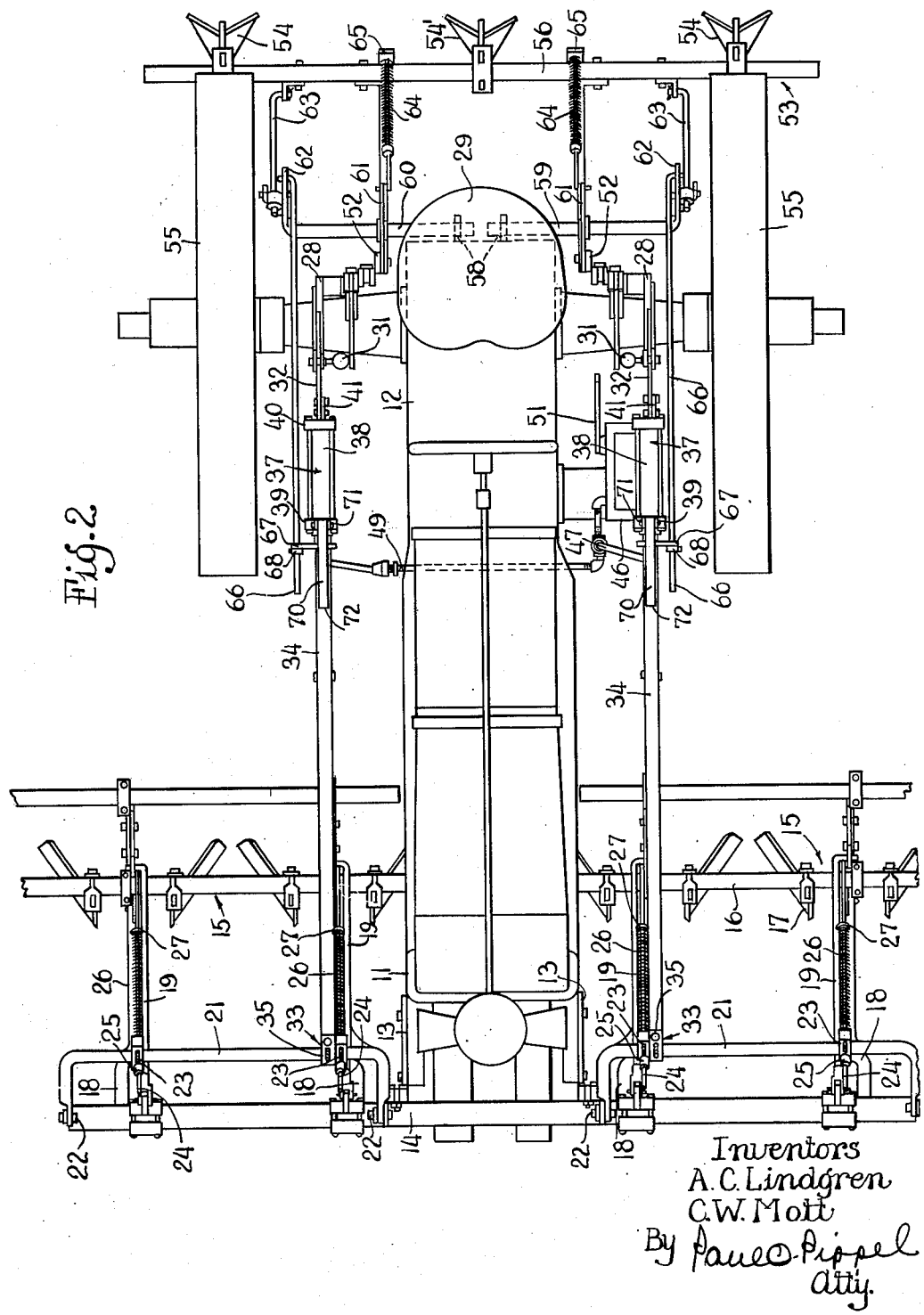
Figure 2 is a plan view of a tractor with the implements arranged at opposite sides of the same and incorporating the form of the invention shown in Figure 1.

Referring now particularly to Figures 1 and 2, there is shown generally a tractor or wheeled frame having a forward portion 11 and a rearward portion 12. To the forward portion 11 there are connected forwardly extending brackets 13 adapted to support a transversely extending supporting bar structure 14 extending outwardly from each side of the tractor. To this supporting bar structure 14 there may be connected a plurality of rigs indicated generally at 15 and there being at least one at each side of the tractor. Each rig 15 may have a transversely extending bar structure 16 along which may be arranged cultivating tools 17. For connecting this rig structure 15 with the supporting bar structure 14 there may be provided spaced links 18 and 19 adapted to give lifting movement to the cultivating rig and to maintain the same level or in proper relation in its working position. Also pivotally connected to the supporting bar structure 14 is a lifting lever 21 pivoted as at 22 and having connected to its free end as at 23 a lifting rod 24 which is connected at its lower end to the rig 15. This lift rod 24 has a lift collar 25 which serves to carry the lift rod upwardly and forwardly when forward pivotal movement of the lever 21 is effected. To serve as means for maintaining the rigs in their ground-working position, assuming that the lever 21 can be locked in the position shown in Figure 1, there is provided the usual pressure spring 26 adapted to bear against the rigidly connected collar 27 to force the working tools 17 into and maintain the same in the ground. These springs 26 naturally will not function until some means is provided to maintain the lever 21 rigidly in the position shown in Figure 1. Such a means for so maintaining the lever 21 may form a part of the present invention and will be described in detail hereinafter.

On the rear portion 12 of the tractor there is connected a vertically extending bracket structure 28 adapted to extend vertically to a location near to the operator's station 29. While one of these structures is now being described, it should be kept in mind that there are two of these structures, one at each side of the tractor. Carried on the upper end of this bracket structure 28 is an adjusting crank 31 having a pinion engagement with a rack portion 32 to the forward end of which are connected the lifting connections for effecting the lifting of the cultivator rigs. This adjusting arrangement is similar to that described in the above mentioned patent and it will be sufficient to say that the same serves to act as an anchor point against which the power actuating means may react when lifting of the cultivating rigs is effected. By operation of the crank 31 the cultivating depth of the rigs may be regulated.

The lifting connections may be designated generally as at 33, and include a longitudinally extending pipe 34 connectable at its forward end with the lever 21 by a strap 35. Referring more particularly to Figures 3 and 4, it will be seen that the rearward end of the pipe 34 telescopes with a sleeve part 36 formed as a projection from a cylinder device of fluid actuating means indicated generally at 37. The fluid actuating device 37 includes a cylindrical part 38 and two head parts 39 and 40 respectively. The sleeve part 36 is rigidly carried or fixed to the head part 39 of the cylinder device 37. The head part 40 is provided with a rearwardly extending connection means 41 for its attachment to the rack 32. Within the cylinder 38 is a piston 42 having attached thereto a piston rod 43 adapted to work through the sleeve part 36 to engage with an abutment 44 within the lifting pipe 34.

The tractor may have a fluid source comprising a fluid pump 45 and a reservoir 46. Fluid may be directed from the pump through hose connections 47 and through a pipe 48 carried by the head parts 39 and 40 of the cylinder device to operate upon its working piston 42 within the cylinder 38. It should be noted that the fluid connections 47, as shown in Figure 1, also include an extension 49 for delivering fluid to the cylinder located on the right-hand side of the tractor as seen in Figure 2. The pump and reservoir mechanism 45—46 may include a valve control arrangement adapted to be operated by a lever 51 accessible to the operator's station 29. When it is desired to effect operation of the cylinder device 37 the lever 51 may be actuated to cause the fluid to be directed through the fluid communication 47 and 49 to their respective fluid cylinder devices. Fluid may be retained in the cylinder devices by means of trap valves which may be tripped by the same control lever 51 by giving the same a movement in reverse of the movement given to the same for effecting the operation of the cylinder devices.

Also connected to the bracket structure 28 there may be a depending structure 52, one at each side of the tractor to which may be pivoted a rear cultivating rig 53 having rear cultivating shovels 54. It will be noted that there is at least one of these shovels located immediately in the rear of each of the tractor wheels 55. The rear rig structure 53 includes a transversely extending tool bar 56 and this may have connected to the same a centrally disposed shovel 54'.

On the rear portion 12 of the tractor there is connected rearwardly extending bearing portions 58, one serving respectively as a bearing for the inner ends of rock-shafts 59 and 60. The outer portions of these rock-shafts 59 and 60 are supported by an overhanging formation 61 on the depending bracket structure 52. Forming a part of these rock-shafts are the lifting arms 62 to which may be connected the lifting rods 63 connected at their lower ends to the rig 53. There may be provided pressure spring devices 64, one at each side of the tractor and anchored respectively against the ends of the overhanging portions 61 and slidably connected to the rigs, as at 65.

Connected to the upper ends of the arms 62 is a forwardly extending link 66 adapted to be connected to the lift pipe 34 by passing through a laterally extending flange portion 67 rigid therewith. This flange portion has an opening for the passage of the connecting link 66 therethrough and serves to retain the link to lift the rear rig 54 when the same engages with a collar member 68 secured to the forward end of the link 66.

It should now be apparent that means has been provided for the connection of rigs so that the same may be respectively operated by the fluid cylinder devices at the respective sides of the tractor. When both of the cylinder devices at both sides of the tractor are operated, the entire rear rig will be raised. When only one cylinder device is operated at a time, only that side of the rig 53, corresponding to that side of the tractor at which the cylinder device is operating, will be raised. It should thus be thoroughly apparent that the fluid cylinder device at one side of the tractor only serves to raise the front and rear implement tools located at that side of the tractor, thereby making that side of the tractor more or less independent, and further making possible the actuating of tools at one side of the tractor independent of the operation of tools at the other side of the tractor.

When the piston 42 travels forwardly, both the rigs on the front portion and on the rear portion of the tractor will be raised together. After the cylinder device 37 has operated, it may be desirable to maintain one of the sets of rigs at any particular side of the tractor in its transport position so that use of the rigs at the opposite side of the tractor may be had independently of the rigs at the one side of the tractor. As disclosed in the above mentioned patent, this may be accomplished by the use of a locking element 70 pivoted as at 71 to the head part 39. When the piston 42 is moved forwardly, to effect lifting of the rig, the element 70 may be swung into position so that its free end 72 may engage with the flange or abutment portion 67 rigidly secured to the rear end of the pipe 34. As illustrated by the dotted lines in Figure 4, when a cylinder device at one side of the tractor is so locked in its transport position, the rigs at the opposite side of the tractor may be operated independently by that cylinder device at that side of the tractor which is not locked at that moment. Such a locking device is not of any value when it is desired to retain one of the rigs at one side of the tractor in its ground operating position while the lifting of the rigs at the opposite side of the tractor is taking place and as they arrive at the end of a point row; or, in other words, to delay the operation of the rigs last to arrive at the end of a point row.

To provide means for locking the rigs at one side of the tractor in their ground-working position, there has been provided a projection 73 on the lock element 70. This portion 73 is so arranged that it also may engage the flange portion 67 as at the front thereof as indicated at 74 in Figures 3 and 4.

When the tractor is in operation with the implements at both sides of the tractor in their ground-working position, the projections 73 may lock over the abutment or flange portion 74 to positively lock the pipe 34 with respect to the cylinder device 37, whereby the pressure springs 26 may have something against which it may react. This locking feature is necessary when a cylinder device of the single acting type is used. As the tractor approaches the end of the field, the lock element 70 at the side of the tractor at which it is desired to have the rigs raised ahead of the raising of the rigs on the side opposite to the same, may be manually lifted out of its contacting engagement with the flange portion 74 by the operator so when the control lever 51 is operated, the cylinder device at that side of the tractor can be operated. As the tractor further approaches the end of the row, for the cultivator rigs at the opposite side of the tractor, the element 70 at that side of the tractor may be lifted by the operator whereby the rigs at that side of the tractor will also be raised to a transport position.

Referring now to the form of the invention shown in the Figures 5 to 8, inclusive, there is shown a toggle link mechanism for locking the telescoping lifting connections in either their extended or unextended position. In these figures there is shown a vertically extending lug 75 welded as at 76 to the rear end of the lifting pipe 34. Pivotally connected to this lug 75 is a short toggle link 77 having a free end adapted to be connected with a toggle link 78 pivoted to the head part 39 of the cylinder device 37, as indicated at 79. The toggle link 78 has a hook portion 81 curled upwardly and extending beyond the point of connection of the link 78 with the short link 77 connected at the point of connection between the two links, and there also is a manual operating lever 82 having a handle portion 83 and a projection 84 angled with respect thereto and extending oppositely from its point of connection with the toggle links 77 and 78. The handle portion 83 has a laterally projecting pin 85 adapted to extend into a location where it may engage the hook portion 81 of the toggle link 78 as shown in Figure 5 or where it may engage the links rearwardly of the point of connection of the lever 82 as shown in the Figures 6, 7, and 8. This lever 82 serves to throw the toggle links either into their holding positions or into a position where they will not serve to hold the telescoping parts. As shown in Figure 5, it will be noted that pipe 34 is positioned so that it covers the sleeve 36. In this position it will be apparent that the cultivating rigs are in their ground-working position. If it is desired to lock the lifting pipe 34 in the position shown in Figure 5, the lever 82 may be rotated in a clockwise direction to force the point of connection between the rigs in a direction about the pivoted ends of the links or into a position shown in Figure 6. In the position shown in Figure 5, and in Figure 7, the toggle mechanism is unlocked and also the lever 82 is properly positioned, and the cylinder device will be free to operate upon the toggle mechanism without the same serving as a locking device.

In the position shown in Figure 7, the pipe 34 has been extended along the sleeve 36 but the links are not located in their over-center position so as to serve as a lock to retain the pipe 34 in that position. To effect locking in the extended position the operating lever 82 is forced rearwardly so that the links 77 and 78 will be forced downwardly so that the pivot connection point between the free ends of the toggle links will be forced below a horizontal and take the position shown in Figure 8.

When it is desired to unlock the toggle mechanism from the position shown in Figures 6 and 8, the handle 83 of the lever 82 need only be moved forwardly so that the projection 84 will cause lifting of the pivotal connection between the links to throw the same to a point over-center and above the horizontal. It should thus be apparent that this toggle mechanism will serve to lock the cultivating rigs in either their working position or in their transport position.

Referring now to Figures 9 and 10, there is shown another form of the invention wherein there is provided a clamping means carried by the rear end of the pipe 34 and adapted to clamp portions of the pipe 34 against the sleeve 36. Since the sleeve 36 is rigid with the cylinder device 37, this means serves definitely to retain the cultivating rigs in any position to which they may be moved.

This clamping means includes a crank 87 having a downwardly extending screw portion 88 adapted to extend through the bifurcated portions 89 rigid with the pipe 34. The rearward end of the pipe 34 has a slot 90 so that the clamping means may be effective to fix the pipe 34 against the sleeve 36.

It should now be apparent that means has been provided for locking cultivating rigs in their working positions as well as for locking the same in their transport positions, and that by this means there has been provided an arrangement whereby cultivating attachments are particularly adapted for the cultivating of "point rows" so that one side may be maintained while the other side may be operated. It should also be apparent that with this means a single acting cylinder may be as effective as a double acting cylinder device inasmuch as the same may be locked in its unextended position as well as in its extended position and whereby the pressure springs may be definitely provided with means against which they may react. With this means the rigs need no longer to be dependent upon gravity for the maintenance of the same in the ground-working position.

While various changes may be made in the forms of the invention, it shall be understood that such changes shall be made without departing from the spirit and scope of the present invention as defined in the appended claims.

What is claimed is:

1. In combination, a frame, an implement connected to the frame for movement with respect thereto, an extensible linkage between the implement and the frame to effect movement of the implement upon being extended, and including overlapping parts, one of said parts having an abutment portion, the other of said parts having a latch element hinged thereon, said latch element having a plurality of portions spaced apart in the direction of extension of the linkage and selectively engageable with the abutment portion to retain the linkage in either its extended or unextended form to thereby retain the implement against movement.

2. In combination, a frame, an implement connected to the frame for movement with respect thereto, an extensible linkage between the implement and the frame to effect movement of the implement upon being extended, and including telescoping parts, one of said parts having an abutment portion, the other of said parts having a latch element pivotally connected thereto and adapted to have its free end brought into engagement with the abutment portion to lock the linkage when extended, and said latch element having a projected portion removed from the free end thereof for engagement with the abutment portion to retain the linkage when it is unextended, whereby the implement may be retained in a plurality of positions to which the same has been moved.

3. In combination, a frame having an operator's station, an implement connected to the frame for movement with respect thereto, means for moving the implement including an extensible linkage located between the implement and the frame, the said extensible linkage having overlapping parts, one of said parts having an abutment portion, the other of said parts having a latch element thereon accessible to the operator's station, said latch element having a plurality of portions thereon adapted for cooperation with the abutment portion of the one part, whereby the implement may be locked in any one of a plurality of positions to which the implement may have been moved.

4. In combination, a tractor having an operator's station, an implement connected to the tractor and having working tools connected respectively at opposite sides of the tractor for vertical movement with respect thereto, an extensible linkage at each side of the tractor for moving the respective working tools, each extensible linkage including overlapping parts, one of said parts having an abutment portion, the other of said parts having a latch element thereon, said latch element being accessible to the operator's station and having a plurality of portions thereon adapted for cooperation with the abutment portion on the one part, whereby the working tools at the respective sides of the tractor may be locked in any one of a plurality of positions to which the respective working tool may have been moved.

5. In combination, a tractor having an operator's station, an implement connected to the tractor and having working tools connected respectively at opposite sides of the tractor for vertical movement with respect thereto, an extensible linkage at each side of the tractor for moving the respective working tools, each extensible linkage including overlapping parts, one of said parts having an abutment portion, the other of said parts having a latch element hinged thereon and accessible to the operator's station, said latch element having a plurality of portions spaced apart in the direction of extension of said linkage and selectively engageable with the abutment portion to retain the linkage in either its extended or unextended form, whereby the working tools at the respective sides of the tractor may be locked in any one of a plurality of positions to which the respective working tool may have been moved.

6. In combination, a frame, an implement connected to the frame for movement with respect thereto, fluid means carried by the frame for moving the implement and including an extensible fluid actuating device, said fluid actuating device having a cylinder part, said implement having an extensible part movable with respect to said cylinder part with an abutment portion thereon, a latch element hinged on the cylinder part and having a plurality of portions spaced lengthwise of the extensible part, said latch element being adapted to engage the abutment portion to retain respectively the linkage in either its extended or unextended form to thereby retain the implement against movement.

ALEXUS C. LINDGREN.
CARL W. MOTT.